(12) United States Patent
Suga et al.

(10) Patent No.: US 6,632,358 B1
(45) Date of Patent: Oct. 14, 2003

(54) TANK FILTRATION APPARATUS CONTAINING HOLLOW FIBER MEMBRANE CARTRIDGE

(75) Inventors: Nobuhiko Suga, Fuji (JP); Hidehiko Tanaka, Chigasaki (JP)

(73) Assignee: Asahi Kasei Kogyo Kabushiki Kaisha (JP)

( * ) Notice: Subject to any disclaimer, the term of this patent is extended or adjusted under 35 U.S.C. 154(b) by 0 days.

(21) Appl. No.: 09/601,072

(22) PCT Filed: Nov. 25, 1999

(86) PCT No.: PCT/JP99/06557
§ 371 (c)(1),
(2), (4) Date: Aug. 24, 2000

(87) PCT Pub. No.: WO00/30740
PCT Pub. Date: Jun. 2, 2000

(30) Foreign Application Priority Data

Nov. 26, 1998 (JP) ............................................. 10-336087

(51) Int. Cl.[7] .................... B01D 63/04; B01D 63/02
(52) U.S. Cl. ............................ 210/323.2; 210/321.88; 210/321.89; 210/451; 210/455; 210/500.23
(58) Field of Search ............................ 210/321.69, 232, 210/321.88, 321.89, 455, 451, 500.23, 323.2

(56) References Cited

U.S. PATENT DOCUMENTS 5,209,852 A  5/1993  Sunaoka et al. ............ 210/636

FOREIGN PATENT DOCUMENTS

| JP | 61-153104 | 7/1986 |
|---|---|---|
| JP | 61-291007 | 12/1986 |
| JP | 62-197106 A | 8/1987 |
| JP | 62-197108 | 8/1987 |
| JP | 1-111405 | 4/1989 |
| JP | 2-241523 | 9/1990 |
| JP | 4-110023 | 4/1992 |
| JP | 4-171030 | 6/1992 |
| JP | 4-256424 | 9/1992 |
| JP | 7-770 | 1/1995 |
| WO | WO 98/28066 | 6/1998 |

*Primary Examiner*—John Kim
(74) *Attorney, Agent, or Firm*—Dickstein, Shapiro, Morin & Oshinsky, LLP

(57) ABSTRACT

A hollow fiber membrane cartridge comprises a bundle of a plurality of hollow fiber membranes, both ends of which are fixed by adhesion, a cartridge head fixed at the periphery of the bundle at one end so as not to permit the passage of liquid either in or out, and a bottom ring fixed at the periphery of the bundle at the other end so as not to permit the passage of liquid either in or out, wherein the cartridge head and the bottom ring are not connected and fixed but are separated, the hollow portion at the end of each hollow fiber membrane on the cartridge head side is open, the hollow portion at the end of each hollow fiber membrane on the bottom ring side is sealed, and a plurality of through-holes are provided in an adhesion and fixation layer on the bottom ring side.

2 Claims, 3 Drawing Sheets

TANK FILTRATION APPARATUS CONTAINING HOLLOW FIBER MEMBRANE CARTRIDGE

TECHNICAL FIELD

The present invention relates to a filtration cartridge using hollow fiber membranes which is set in a tank type filtration apparatus or a rack type filtration apparatus. More particularly, the present invention relates to a hollow fiber membrane cartridge used in a filtration apparatus for removing turbidity and bacteria from a large volume of raw water such as river water, lake water, underground water, sea water, life waste water or industrial waste water.

The present invention relates also to a tank type or rack type filtration apparatus using the above-mentioned hollow fiber membrane cartridge(s).

BACKGROUND ART

JP-A-61-153104 discloses, as a conventional cartridge using hollow fiber membranes, the cartridge shown in FIG. 3 which has the following structure: a plurality of hollow fiber membranes are accommodated in a cylindrical casing, both ends of each hollow fiber membrane are fixed to the cylindrical casing in upper and lower, respectively, adhesion and fixation portions, and the cylindrical casing is a casing integrally molded so as to extend to the upper and lower ends of the hollow fiber membranes. The hollow portions of a large number of the hollow fiber membranes are open in the upper adhesion and fixation portion of the cartridge but are sealed in the lower adhesion and fixation portion, and an adhesive layer in the lower adhesion and fixation portion has a plurality of through-holes. An air chamber surrounded by the cylindrical casing is formed under the lower adhesion and fixation portion.

This hollow fiber membrane cartridge is for filtration under external pressure and is used after being set in a filtration column. When materials incapable of permeating the membranes are accumulated on the outer surfaces of the membranes, the filtering capability of the membranes is deteriorated, and therefore a washing procedure for removing the accumulated materials on the surfaces of the membranes is carried out after filtration for a definite time.

A method for washing called air bubbling is known. This method comprises the steps of introducing air into the hollow fiber membrane cartridge through its lower portion in a filtration column filled with raw water, and vibrating the hollow fiber membranes in a gas-liquid mixed fluid to peel off the accumulated materials on the surfaces of the membranes.

However, in the hollow fiber membrane cartridge, air bubbling does not permit sufficient washing in some cases because both ends of each hollow fiber membrane are fixed to the cylindrical casing, so that the vibration of the hollow fiber membranes is limited. This phenomenon is remarkable and causes troubles in some cases in a long-term filtration operation, particularly when the outside diameter of the cartridge is large.

DISCLOSURE OF THE INVENTION

In order to solve such problems, the present invention is intended to provide a hollow fiber membrane cartridge which facilitates the peeling-off of suspended materials accumulated on the outer surfaces of hollow fiber membranes by enabling each hollow fiber membrane to vibrate as much as possible at the time of washing by air bubbling, and permits easy discharge of the peeled-off suspended materials from the hollow fiber membrane cartridge.

That is, the present invention relates to a hollow fiber membrane cartridge comprising a bundle of a plurality of hollow fiber membranes, both ends of which are fixed by adhesion, a cartridge head fixed at the periphery of the bundle at one end so as not to permit the passage of liquid either in or out, and a bottom ring fixed at the periphery of the bundle at the other end so as not to permit the passage of liquid either in or out, wherein the cartridge head and the bottom ring are not connected or fixed but are separated. The hollow portion at the end of each hollow fiber membrane on the cartridge head side is open, the hollow portion at the end of each hollow fiber membrane on the bottom ring side is sealed, and a plurality of through-holes are provided in an adhesion and fixation layer on the bottom ring side. In one embodiment of the present invention, the end of the bottom ring is fixed by adhesion to the periphery of the bundle of the hollow fiber membranes so as to extend out beyond the end of the bundle of the hollow fiber membranes.

When the above-mentioned structure according to the present invention is employed, each hollow fiber membrane can be vibrated with maximum amplitude in a permissible range because no cylindrical casing covering the whole hollow fiber membranes is present at the periphery of the hollow fiber membrane cartridge. As a result, suspended materials accumulated on the outer surfaces of the hollow fiber membranes become easy to peel off at the time of washing by air bubbling, and the suspended materials peeled off become easy to discharge from the hollow fiber membrane cartridge. Therefore, the filtering capability can be maintained stably for a long period of time.

In addition, when the end of the bottom ring of the hollow fiber membrane cartridge is fixed by adhesion so as to extend out beyond the end of the bundle of the hollow fiber membranes, gas for air bubbling can be reserved inside the bottom ring and hence can be efficiently conducted to the hollow fiber membranes through the through-holes provided in the adhesion and fixation layer on the bottom ring side, so that washing by air bubbling can be satisfactorily carried out.

Furthermore, the present invention relates to a tank type or rack type filtration apparatus using the above-mentioned hollow fiber membrane cartridge(s).

BEST MODE FOR CARRYING OUT THE INVENTION

An embodiment of the hollow fiber membrane cartridge of the present invention is explained below with reference to the drawings.

Figure 1:
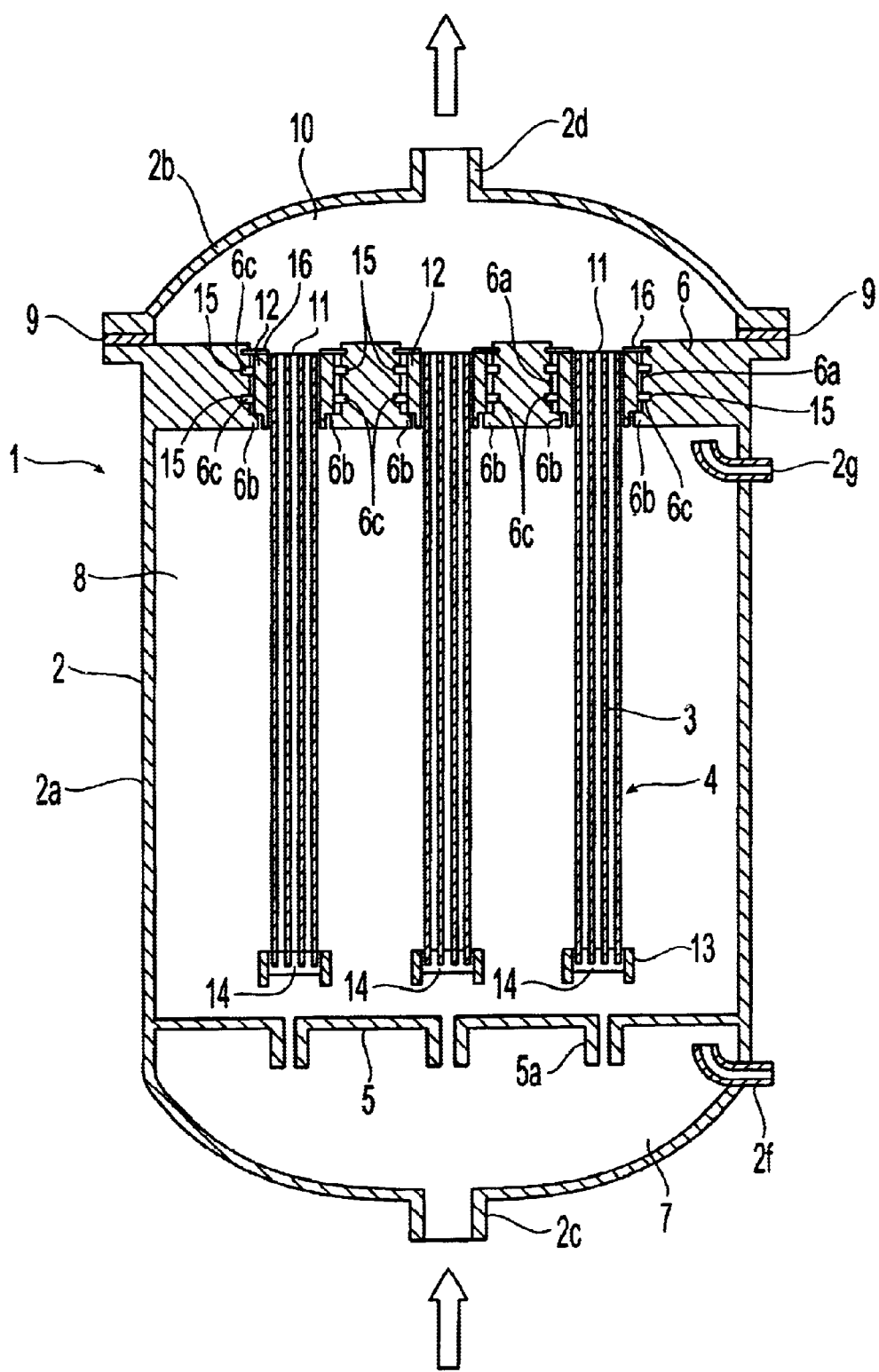
FIG. 1 is a sectional illustration showing one embodiment of the hollow fiber membrane cartridge of the present invention supported in a suspended state in a tank type filtration apparatus.
Figure 2:
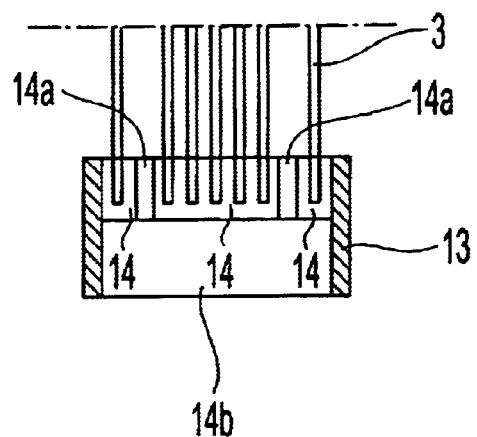
FIG. 2 is an enlarged view of the principal part showing the structure of the bottom ring adhesion and fixation portion of the hollow fiber membrane cartridge.
Figure 3:
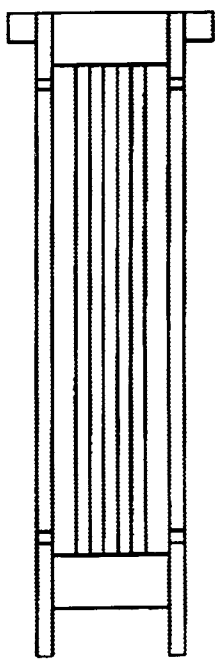
FIG. 3 is a schematic illustration of a well-known hollow fiber membrane cartridge.

FIG. 1 is a sectional illustration showing one embodiment of the hollow fiber (yarn) membrane cartridge of the present invention supported in a suspended state in a tank type filtration apparatus. FIG. 2 is an enlarged view of the principal part for explaining the structure of the bottom ring adhesion and fixation portion of the hollow fiber membrane cartridge.

In FIG. 1, the hollow fiber membrane cartridge 4 of the present invention is composed of a large number of hollow fiber (filament) membranes 3, an adhesion and fixation layer 11, a cartridge head 12, an adhesion and fixation layer 14 and a bottom ring 13. At one end of a bundle of the hollow fiber membranes 3, the hollow fiber membranes are integrally bonded to one another with an adhesive and are integrally attached to the inside of the cartridge head 12 to form the adhesion and fixation layer 11. The ends of the hollow fiber membranes 3 on the cartridge head 12 side are open.

At the other end of the bundle of the hollow fiber membranes 3, the hollow fiber membranes are integrally bonded to one another with an adhesive and are integrally attached to the inside of the bottom ring 13 to form the adhesion and fixation layer 14. The ends of the hollow fiber membranes 3 on the bottom ring 13 side, however, are sealed. As shown in FIG. 2, a plurality of through-holes 14a are formed in the adhesion and fixation layer 14 in order to introduce raw water or gas for washing into the bundle of the hollow fiber membranes and bring the raw water or the gas effectively into contact with the periphery surface of each hollow fiber membrane.

The diameter of the hollow fiber membrane cartridge 4 is 30 mm to 800 mm, preferably 80 mm to 800 mm. The length of the hollow fiber membrane cartridge 4 is chosen in a range of 300 mm to 3,000 mm.

In the present invention, the cartridge head 12 and the bottom ring 13 are not connected or fixed but are separated. Therefore, no conventional cylindrical casing is present at the periphery of the bundle of the hollow fiber membranes 3 between the cartridge head 12 and the bottom ring 13, and substantially throughout this range, the hollow fiber membranes 3 are exposed. However, the periphery of the bundle of the hollow fiber membranes 3 may be covered with, for example, a flexible resin net having large openings which does not limit the vibration of the hollow fiber membranes and does not substantially hinder the passage of a fluid. In this case, the net is not directly fixed to either the cartridge head 12 or the bottom ring 13 but is embedded in the adhesion and fixation layer 14 to be fixed. Damage to the hollow fiber membranes 3 by conveyance can be prevented by covering the bundle of the hollow fiber membranes with the flexible net.

As the hollow fiber membrane 3 used in the present invention, reverse osmosis membranes, nanofiltration membranes, ultrafiltration membranes and microfiltration membranes can be used from the viewpoint of pore size. A material for the hollow fiber membrane 3 is not particularly limited and includes polysulfones, polyether sulfones, polyacrylonitriles, polyimides, polyether imides, polyamides, polyether ketones, polyether ether ketones, polyethylenes, polypropylenes, poly(4-methylpentene)s, celluloses, cellulose acetates, poly(vinylidene fluoride)s, ethylene-tetrafluoroethylene copolymers, polytetrafluoroethylenes, etc. Composite materials thereof can also be used. As to the shape of the hollow fiber membrane, hollow fiber membranes having an inside diameter of 50 μm to 3,000 μm and a ratio of inside diameter to outside diameter of 0.3 to 0.8 can be used.

The adhesive used in the present invention includes polymeric materials such as epoxy resins, urethane resins, epoxyacrylate resins, silicone resins, etc. A method for the adhesion includes well-known methods such as centrifugal adhesion method, still-standing adhesion method, etc. When the curing shrinkage and strength of the adhesive are desired to be improved, a fibrous material such as glass fiber or carbon fiber, or fine powder of carbon black, alumina, silica or the like may be incorporated into the above-exemplified adhesive.

Materials for the cartridge head 12 and the bottom ring 13 used in the present invention are not particularly limited and may be the same or different. Thermoplastic resins and stainless steel are preferably used as the materials. As the thermoplastic resins, there are used polyethylenes, polypropylenes, poly(4-methylpentene)s, poly(vinyl chloride)s, poly(vinylidene fluoride), ethylene-tetrafluoroethylene copolymers, polytetrafluoroethylenes, polycarbonates, acrylonitrile-butadiene-styrene copolymers (ABS), polyphenylene ethers, polysulfones, polyether sulfones, polyether imides, polyamides, polyether ketones, polyether ether ketones, etc. As the stainless steel, SUS304, SUS316, etc. are used.

The cartridge head 12 serves not only as a fixation portion for suspending the hollow fiber membrane cartridge 4 in a tank type filtration apparatus or a rack type filtration apparatus but also as a sealing portion for separation between raw water and filtered water. Therefore, the cartridge head 12 is produced in a shape suitable for the suspension, the fixation and the structure of a seal. For example, a level difference, a groove or a collar projecting outside in the direction of diameter may be provided at the periphery of the cartridge head 12. Although the shape of section in the direction of diameter of the cartridge head 12 may be round, square, hexagonal, oval or the like, it is preferably round from the viewpoint of sealing properties between the cartridge head 12 and an adhesion and fixation portion therefor and ease of production of a filtration tank.

The through-holes 14a provided in the adhesion and fixation layer 14 on the bottom ring side in the present invention are holes made in the adhesion and fixation layer itself. As to the size of the through-holes, their equivalent diameter is chosen in a range of 2 mm to 30 mm. Here, the equivalent diameter is defined as 4×(sectional area of flow path)/(circumference). The shape of the through-holes is selected from polygons (e.g. triangle, tetragon and hexagon), a round shape, an oval, a fan shape, a C shape, a star shape, etc. Although the number of the through-holes is dependent on the sectional area of the cartridge and the number of fibers, it is 2 to 300. As to the positions of the through-holes, the through-holes are preferably formed as follows: when an explanation is given by taking the case of a certain adhesion and fixation section, the through-holes are dispersed on the adhesion and fixation section, for example, at the intersections of multiplexed circles and radial lines, the intersections of lattices, or the apexes of a large number of equilateral triangles. It is especially preferable to form many of the through-holes in the central portion of the bundle of the hollow fiber membranes.

In the present invention, the bottom ring 13 is preferably fixed at the periphery of the bundle of the hollow fiber membranes so as to jut out beyond the ends of the hollow fiber membranes 3, to form an air chamber 14b surrounded by the adhesion and fixation layer and the bottom ring. Although the length of a portion of the bottom ring 13 which juts out from the ends of the hollow fiber membranes is dependent on the diameter of the cartridge, the volume of a gas supplied and the diameter and number of the through-holes, it is preferably 5 mm to 200 mm for preventing dispersion and loss of the gas. When said portion is too long, the total length of the cartridge is undesirably long, resulting in the formation of a useless space. When said portion is too short, the gas supplied to the cartridge is undesirably dispersed and lost in the lateral direction without being effectively introduced into the through-holes.

The shape of section in the direction of diameter of the bottom ring 13 may be round, square, hexagonal, oval or the like. When the cartridge is set in a filtration tank, the shape of section is preferably the same as that of the cartridge head, and a round shape is especially preferable as the shape of section.

The hollow fiber membrane cartridge of the present invention can be produced as follows. A bundle of hollow fiber membranes whose hollow portions have been stopped at one end of the bundle is inserted into a cartridge head 12, and an adhesive is introduced into the cartridge head 12 to adhere and fix the hollow fiber membranes to one another and adhere and fix the bundle of the hollow fiber membranes to the cartridge head 12, so as not to permit the passage of liquid either in or out. The hollow fiber membranes and the adhesion and fixation layer are cut together to open the ends of the hollow fiber membranes. The other ends of the hollow fiber membranes are inserted into a bottom ring 13 without stopping their hollow portions, and a predetermined rod, pipe or plate for forming through-holes 14a is set in the bundle of the hollow fiber membranes. Then, an adhesive is introduced into the bottom ring 13 to adhere and fix the hollow fiber membranes to one another and adhere and fix the bundle of the hollow fiber membranes to the bottom ring 13. In this case, the hollow portions at the ends of hollow fiber membranes are sealed with the adhesive at the same time. Thereafter, the rod, pipe or plate for forming through-holes 14a is taken out of the adhesion and fixation layer to form through-holes 14a. The following is also possible: a rod, pipe or plate for forming through-holes 14a is set in the bundle of the hollow fiber membranes, followed by adhesion and fixation, and the instrument for forming through-holes 14a is taken out, after which a bottom ring 13 is fixed at the periphery of the adhesion and fixation layer by adhesion or welding.

An example of tank type filtration apparatus (FIG. 1) comprising the hollow fiber membrane cartridges of the present invention suspended and fixed therein is explained below.

In FIG. 1, numeral 1 denotes a tank type filtration apparatus for filtering raw water fed, which can be used for water treatment in reducing turbidity and bacteria from a large volume of raw water such as river water, lake water, underground water, sea water, life waste water or industrial waste water.

The filtration tank 2 of the tank type filtration apparatus 1 is composed of a tank main body 2a and a lid 2b, and a separation plate 5 and a partition plate 6 are fixed on the inner wall of the tank main body 2a at predetermined heights, respectively, by welding or the like so as not to permit the passage of liquid either in or out. A feed water chamber 7 is formed of a space formed by the lower portion of the tank main body 2a and the separation plate 5, and a feed water chamber 8 is formed of a space formed by the middle portion of the tank main body 2a, the separation plate 5 and the partition plate 6. A treated water chamber 10 is formed of a space formed by the partition plate 6 and the lid 2b through a packing 9.

As described above, the inside of the filtration tank 2 is divided into the three chambers by the separation plate 5 and partition plate 6 fixed in the filtration tank 2, and each hollow fiber membrane cartridge 4 of the present invention is suspended in the feed water chamber 8 with its one end held by the partition plate 6.

The partition plate 6 holding the hollow fiber membrane cartridge 4 suspended therefrom is made in a predetermined thickness so as to have a sufficient strength to withstand a load applied by the hollow fiber membrane cartridge and water pressure. A plurality of through-holes 6a for inserting the hollow fiber membrane cartridges 4 are formed at predetermined positions of the partition plate 6.

In the lower portion of each through-hole 6a of the partition plate 6, a projection 6b jutting inside the through-hole 6a in the direction of diameter is formed, and the lower end of the cartridge head 12 provided at the periphery at the upper end of the hollow fiber membrane cartridge 4 is caught by the projection 6b to suspend and hold the hollow fiber membrane cartridge 4. As another embodiment, the following is possible: a collar jutting outside in the direction of diameter is formed on the cartridge head, and its underside is brought into contact with the top surface of the partition plate 6 through a gasket to suspend and hold the hollow fiber membrane cartridge.

An O-ring 15 is fitted in a groove 6c formed on the wall surface of each through-hole 6a of the partition plate 6, and the outer wall surface of the cartridge head 12 is bonded to the O-ring 15 by pressure welding, whereby the cartridge head 12 is attached to the partition plate 6 so as not to permit the passage of liquid either in or out. A groove for fitting the O-ring 15 therein may be formed on the cartridge head 12.

The upper edge face of the cartridge head 12 is moored by a mooring member 16 which has been provided on the wall surface of each through-hole 6a of the partition plate 6 so as to be removable, whereby the cartridge head 12 is fixed to the partition plate 6 and the hollow fiber membrane cartridge 4 is stably accommodated in the filtration tank 2.

In the above structure, during filtration operation using the tank type filtration apparatus 1, raw water fed into the feed water chamber 7 through a feed water inlet 2c provided in the lower portion of the tank main body 2a of the filtration tank 2 by means of a pump (not shown) is fed into the feed water chamber 8 through the nozzle 5a of the separation plate 5 to fill up the feed water chamber 8, and is then conducted to the periphery surface of each hollow fiber membrane 3.

The raw water near the periphery of each hollow fiber membrane 3 is filtered under pressure through the hollow fiber membrane 3 from the outside to the inside, and the filtered water is introduced into the treated water chamber 10 through the opened upper end of the hollow fiber membrane 3. The filtered water accommodated in the treated water chamber 10 is taken out of the filtration tank 2 through a treated water outlet 2d provided in the upper portion of the lid 2b.

As another filtration operation method, a method can be adopted which comprises carrying out filtration by sucking air in the treated water chamber 10 through the treated water outlet 2d by means of a suction pump (not shown) to reduce the pressure, while filling the feed water chamber 8 with raw water.

When the hollow fiber membranes 3 are subjected to back washing with the filtered water, the filtered water is supplied through the treated water outlet 2d and allowed to flow backward into the feed water chamber 8 to remove suspended materials (materials incapable of permeating the membranes) accumulated on the outer walls of the hollow fiber membranes 3, after which it is introduced into the feed water chamber 7 through the nozzle 5a and then discharged from the filtration tank 2 through the feed water inlet 2c.

When the hollow fiber membranes 3 are subjected to air bubbling, air is supplied at first to the feed water chamber 7 through an air inlet 2f provided in the lower portion of the tank main body 2a, with the feed water chamber 8 filled with raw water. The air whose pressure has been adjusted in the feed water chamber 7 flows as bubbles into the feed water chamber 8 filled with the raw water, through the nozzle 5a provided on the separation plate 5, and the air is conducted to the side of the periphery of each hollow fiber membrane 3 from the bottom ring 13 through the through-holes 14a of the adhesion and fixation layer 14 to stir water in the bundle of the hollow fiber membranes 3 and vibrate the hollow fiber membranes 3. Thus, the air peels off the suspended materials adhering to the surfaces of the hollow fiber membranes 3. Air accumulated in the upper portion of the feed water chamber 8 is discharged from the filtration tank 2 through an air outlet 2g provided in the upper portion of the tank main body 2a.

In the above air bubbling operation, for example, air, nitrogen gas or oxygen gas is supplied at first, with the feed water chamber 8 filled with the raw water, namely, with the raw water being at rest and staying in the feed water chamber 8. After air bubbling, the above-mentioned back washing operation is carried out to wash away the suspended materials peeled off as described above, with filtered water supplied through the treated water outlet 2d. The filtered water containing the suspended materials peeled off is discharged from the filtration tank 2 through the nozzle 5a provided on the separation plate 5, the feed water chamber 7 and the feed water inlet 2c, and accommodated in a waste water tank (not shown). Either the air bubbling operation or the back washing operation may be carried out at first, and the frequencies of the back washing operation and the air bubbling operation are preferably determined while monitoring the stability of the filtration operation.

In addition, an example of tank type filtration apparatus (FIG. 4) comprising the hollow fiber membrane cartridges of the present invention suspended from and fixed to a treated water header piping is explained below.

Figure 4:
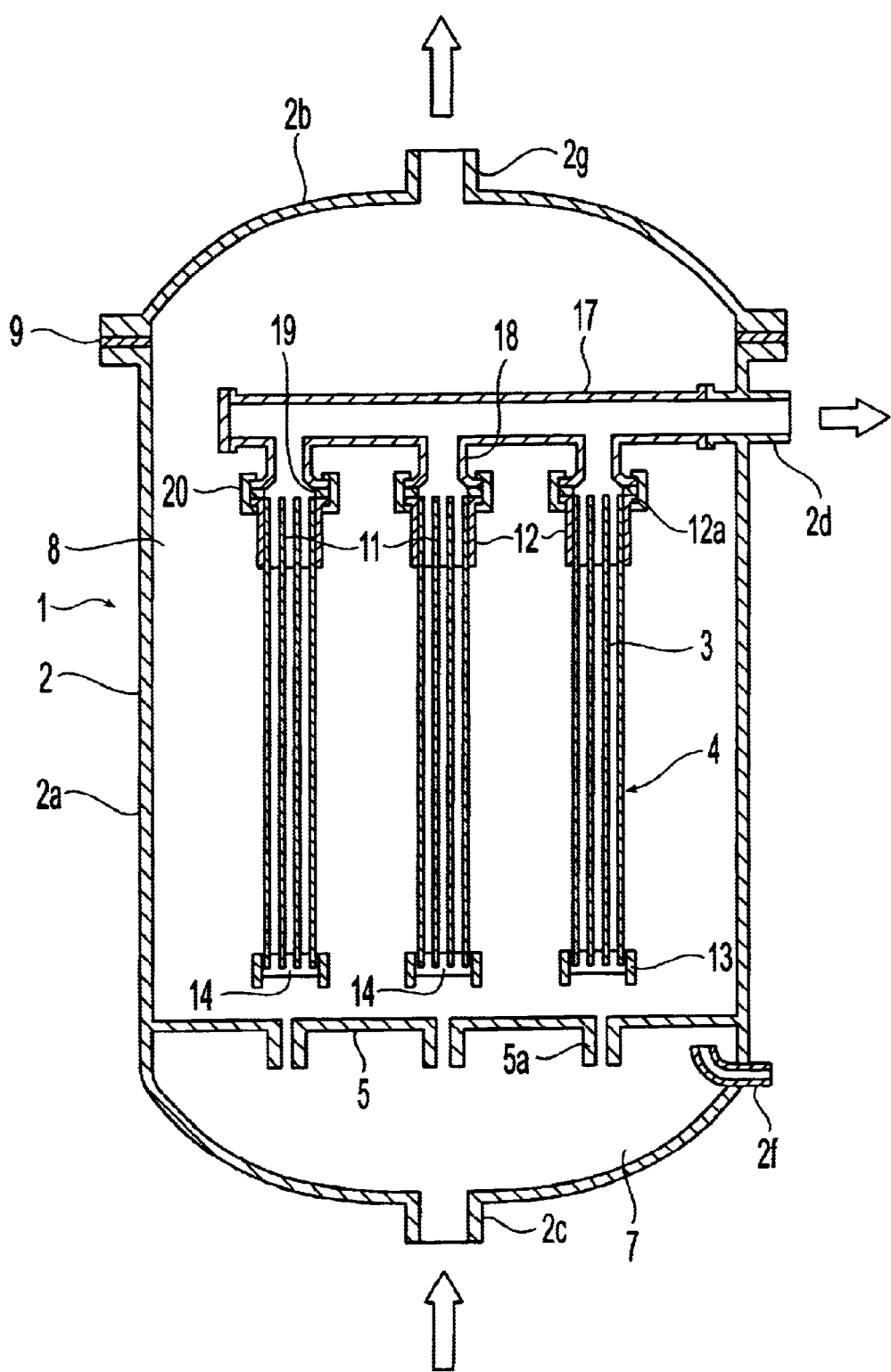
FIG. 4 is a sectional illustration showing one embodiment of the hollow fiber membrane cartridge of the present invention fixed by suspension from a treated water header piping in a tank type filtration apparatus.

In FIG. 4, each hollow fiber membrane cartridge 4 is suspended from and fixed to a branch pipe 18 branched from a treated water header piping 17, by using a cartridge head collar 12a provided at the periphery of the cartridge head 12 and a clamp 20 through a gasket 19.

In the above structure, during filtration operation using the tank type filtration apparatus 1, raw water fed into a feed water chamber 7 through a feed water inlet 2c provided in the lower portion of the tank main body 2a of a filtration tank 2 by means of a pump (not shown) is fed into a feed water chamber 8 through the nozzle 5a of a separation plate 5 to fill up the feed water chamber 8, and is then conducted to the periphery surface of each hollow fiber membrane 3. The raw water near the periphery of each hollow fiber membrane 3 is filtered under pressure through the hollow fiber membrane 3 from the outside to the inside, and the filtered water is introduced into the treated water header piping 17 through the opened upper end of the hollow fiber membrane 3 and the branch pipe 18. The filtered water in the treated water header piping is discharged from the filtration tank 2 through a treated water outlet 2d provided in the tank main body 2a.

The concentrated water not filtered through the hollow fiber membranes 3 is discharged from the filtration tank 2 through a concentrated water outlet 2g of the lid 2b provided in the upper portion of the filtration tank 2.

When the hollow fiber membrane cartridges 4 are subjected to air bubbling, air is supplied at first to the feed water chamber 7 through an air inlet 2f provided in the lower portion of the tank main body 2a, with the feed water chamber 8 filled with raw water. The air whose pressure has been adjusted in the feed water chamber 7 flows as bubbles into the feed water chamber 8 filled with the raw water, through the nozzle 5a provided on the separation plate 5, and the air is conducted to the side of the periphery of each hollow fiber membrane 3 from the bottom ring 13 through the through-holes 14a of the adhesion and fixation layer 14 to stir water in the bundle of the hollow fiber membranes 3 and vibrate the hollow fiber membranes 3. Thus, the air peels off the suspended materials adhering to the surfaces of the hollow fiber membranes 3. The air that has vibrated the hollow fiber membranes 3 is discharged from the filtration tank 2 through an air outlet 2g provided in a lid 2b.

Industrial Applicability

The hollow fiber membrane cartridge 4 of the present invention has no cylindrical casing attached to the periphery and hence can permit vibration of its hollow fiber membranes 3 as much as possible. Thus, the ability to peel off suspended materials accumulated on the outer surfaces of the hollow fiber membranes 3 at the time of air bubbling operation can be improved, and the suspended materials peeled off can easily be discharged from the hollow fiber membrane cartridge 4. Furthermore, since a bottom ring 13 jutting out beyond the ends of the hollow fiber membranes 3 is provided at the lower end of the hollow fiber membrane cartridge 4 and through-holes 14a are provided in an adhesion and fixation layer 14 on the bottom ring side, a gas supplied can be efficiently introduced into the bundle of the hollow fiber membranes. Therefore, when the cartridge of the present invention is used, air bubbling operation can be efficiently carried out, so that the filtering capability of a filtration apparatus can be maintained stably for a long period of time.

What is claimed is:

1. A tank filtration apparatus comprising a filtration tank, a separation plate, a treated water header piping, branch pipes branched from said treated water header piping, and a hollow fiber membrane cartridge, wherein said hollow fiber membrane cartridge comprises a bundle of a plurality of hollow fiber membranes, both ends of which are fixed by adhesion, a cartridge head fixed at the periphery of the bundle at one end so as not to permit the passage of liquid either in or out, and a bottom ring fixed at the periphery of the bundle at the other end so as not to permit the passage of liquid either in or out, wherein the cartridge head and the bottom ring are not connected or fixed to each other but are separated, and no cylindrical casing covering the whole hollow fiber membranes is present, the hollow portion at the end of each hollow fiber membrane on the cartridge head side is open, the hollow portion at the end of each hollow fiber membrane on the bottom ring side is sealed, a plurality of through-holes are provided in an adhesion and fixation layer on the bottom ring side, said cartridge head has a collar at its periphery, and said hollow fiber membrane cartridge(s) is suspended from the branch pipe by its collar.

2. A tank filtration apparatus according to claim 1, wherein the end of the bottom ring is fixed to the periphery surface of the bundle of the hollow fiber membranes so as to jut out beyond the end of the bundle of the hollow fiber membranes.

* * * * *